United States Patent
Sothen et al.

[15] 3,643,919
[45] Feb. 22, 1972

[54] SCREW-DRIVEN SUPPORT FOR APPLIANCES OR THE LIKE

[72] Inventors: Andrew G. Sothen, 24 West National Drive, Newark, Ohio 43055; Richard S. Spaulding, 887 Woodhill Drive, Columbus, Ohio 43212

[22] Filed: Oct. 13, 1970

[21] Appl. No.: 80,349

[52] U.S. Cl. .................................................254/98
[51] Int. Cl. .........................................B66f 3/08, B66f 3/18
[58] Field of Search ..................................254/98–103, 89 R

[56] References Cited

UNITED STATES PATENTS

| | | | |
|---|---|---|---|
| 2,885,221 | 5/1959 | Weeks | 254/100 X |
| 3,123,418 | 3/1964 | Haerther et al. | 312/319 |

*Primary Examiner*—Othell M. Simpson
*Attorney*—Kemon, Palmer & Estabrook

[57] ABSTRACT

An apparatus for supporting and moving a major kitchen appliance to and from a given position. An electric motor operatively connected to a pair of screwjacks that are attached to the appliance readily facilitate the moving of said appliance a predetermined distance from its initial or original position. The motor is capable of rotatably driving the screwjacks in a forward or reverse direction to permit the appliance to be moved and then returned to its initial position.

4 Claims, 6 Drawing Figures

PATENTED FEB 22 1972 3,643,919
SHEET 1 OF 2
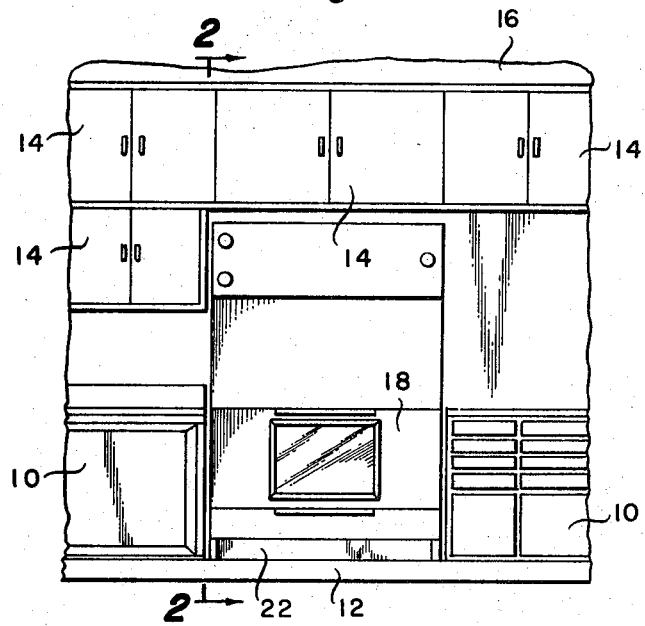
Fig. 1
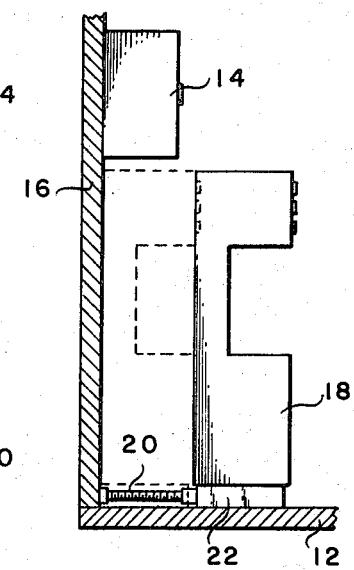
Fig. 2
Fig. 3
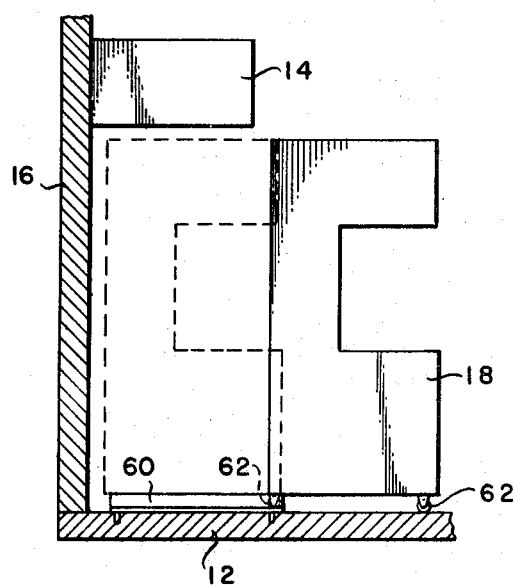
Fig. 4
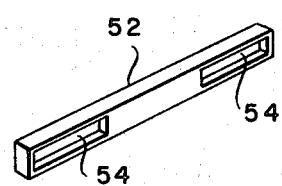
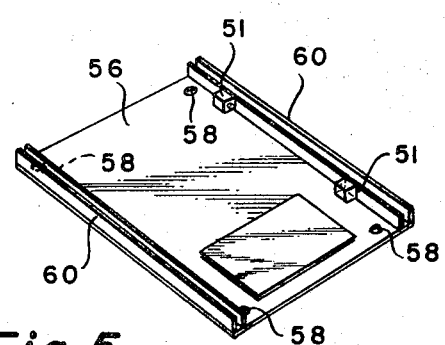
Fig. 5
INVENTOR.
Andrew G. Sothen
Richard A. Spaulding
BY Kenmore, Palmer + Estabrook
ATTORNEYS

SCREW-DRIVEN SUPPORT FOR APPLIANCES OR THE LIKE

BACKGROUND OF THE INVENTION

The present invention is directed to a device or an apparatus for moving what is commonly referred to as a major kitchen appliance such as a gas or electric range, freezer, washing machine for dishes or clothes, refrigerator or the like. In the majority of instances appliances of the foregoing type, whether they be used in commercial establishments such as restaurants, cafeterias and the like or in the conventional household, are usually placed in a designated spot or position at the time of their installation and remain there until they are replaced or are moved only if they have to be repaired or serviced. The average user does not attempt to move an appliance of this type and if a need arises wherein such an appliance must be moved, a dolly or handtruck with a toeplate is usually employed by a person who is capable of moving such a device.

While the prior art has disclosed the broad general concept of utilizing a screwjack device that may be motor driven, it does not teach or disclose the contribution of the present application which is directed to the moving of a major appliance of the type found in a kitchen whether it be of the commercial or the residential type to and from a given position. While such major appliances can be provided with casters or rollers in an effort to facilitate their being moved from one place to another, their size and weight still dictates that considerable manual effort must be expended to effect such movement.

In many instances, the arrangement of cabinets and cupboards along with major appliances in present day kitchens is such that said appliances are positioned between a pair of cabinets and beneath a wall-hanging cupboard, or adjacent to other appliances of a large size and relative heavy weight. This type of arrangement almost precludes the manual moving of such an appliance. Thus when it becomes necessary to service or repair such an appliance or to simply clean the wall and floor area adjacent thereto, the moving of the appliance or appliances becomes quite a task.

SUMMARY

The present invention is directed to the concept of a motor-driven screwjack apparatus that may be connected to a suitable support, such as a kitchen wall in a restaurant, cafeteria, or a home and to a major appliance such as an electric or gas range. The device of the present invention readily facilitates and permits the moving of such an appliance away from the wall of the room by anyone as it does not require any manual effort on the part of the operator to effect such movement. The motor which operates the screwjack is of a conventional type that is controlled by a switch mechanism and permits the device to be operated so as to move the gas or electric range away from a wall and out from between a bank of cabinets or other appliances. This permits the area normally occupied by the range to be readily and easily cleaned or the appliance to be repaired or serviced. Thus an object of the present invention is to provide a motor-driven device for moving a major appliance of the kitchen type to and from a given position. Another object is to provide a motor-driven screwjack apparatus that is interposed between a major kitchen appliance and the wall of a room to effect the movement of said appliance towards and away from said wall.

BRIEF DESCRIPTION OF THE DRAWINGS

FIG. I is a front elevational view of a fragmentary portion of a bank of kitchen cupboards and cabinets with a gas or electric range positioned between said cupboards and cabinets;

FIG. II is a vertical sectional view showing the range in full lines as being moved away from the wall and in dotted lines as being positioned adjacent the wall within the bank of cabinets and cupboards, the view being taken on the line 2—2 of FIG. I;

Figure 6:
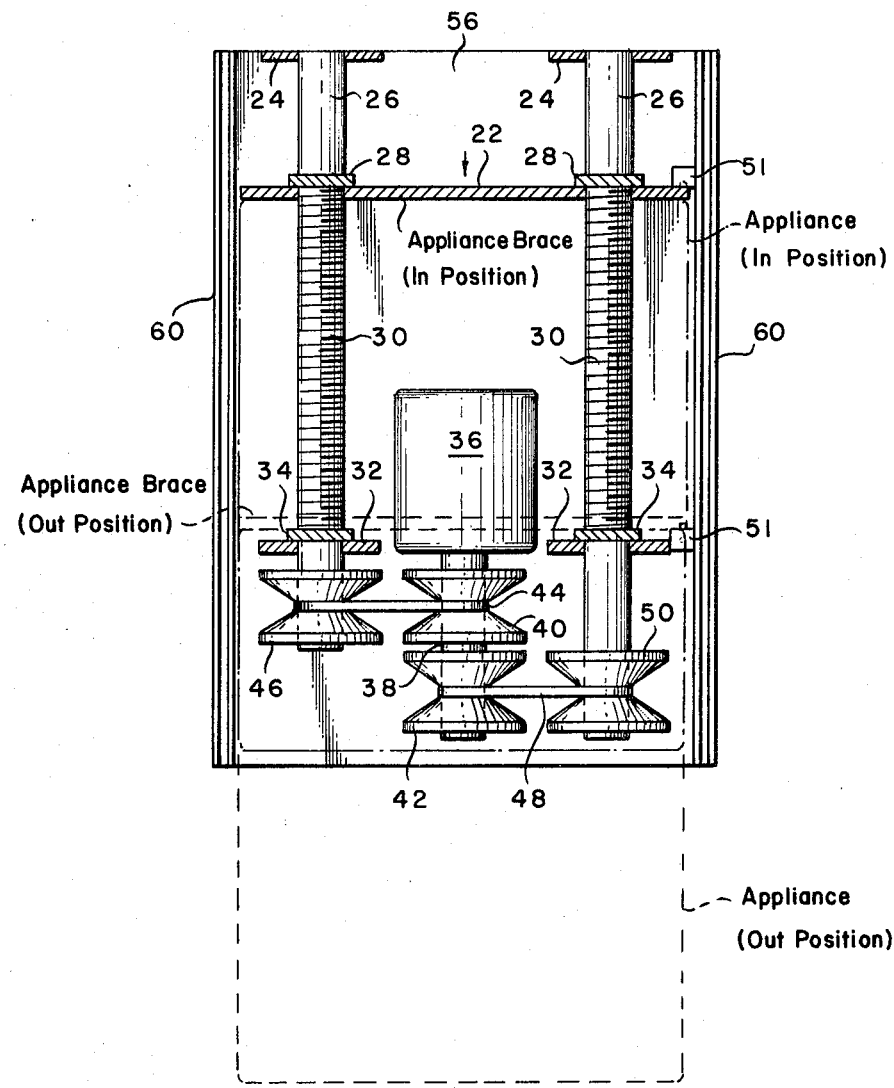

FIG. III is a perspective view of a plate or housing member that is adapted to be mounted upon the wall;

FIG. IV is a vertical sectional view similar to FIG. II showing a modified form of mounting;

FIG. V is a plan view of a base or mounting plate embodied in the disclosure of FIG. IV; and FIG. VI is a plan view of the motor-driven screwjack mechanism with the appliance shown in dotted lines and in a position outwardly of or away from the wall.

DESCRIPTION OF THE PREFERRED EMBODIMENT

There is shown in FIG. I kitchen installation of cabinets and cupboards with a pair of the cabinets 10 being mounted in spaced relation to one another upon a suitable support or base 12 such as a conventional kitchen floor. There are additional cabinets 14 that are secured to an abutting or wall member 16 in vertically spaced relation to the base or floor cabinets 10. The base or floor cabinets 10 have interposed there between a conventional gas or electric range 18 that is positioned upon the support or base member 12 and in substantially abutting relationship with the wall member 16. While the range 18 is shown positioned beneath and adjacent to certain of the cabinets or cupboards 14 that are mounted upon the wall member 16 this is purely by way of illustration and is not intended to limit or restrict the present invention. It is readily apparent that the appliance as illustrated by the range 18 could be positioned between other large appliances such as a freezer and dishwasher in lieu of the cabinets 10 and still fall within the scope of the present invention. As distinguished from the cabinets or cupboards 10 which are usually secured to the support or base member 12 by any suitable means, not shown, the range 18 is so positioned between said cabinets or cupboards as to be readily capable of being moved over the support or base member 12 either towards or away from the wall member 16. As shown in FIG. II a screwjack mechanism 20 has moved the range 18 over the support or base member 12 from its dotted line position adjacent the wall member 16 to its full line position where it is in spaced relation to the wall 16 and out from between adjacent appliances or from under the wall-mounted cabinets or cupboards 14. The screwjack mechanism 20 is connected to the base portion 22 of the range 18 in order to effect the movement of the range over the support or base member 12 either way from or towards the wall member 16.

The screwjack mechanism as shown in FIG. VI includes a pair of plate members 24 which are secured to the wall member 16 in spaced parallel relation to one another by any suitable means, now shown. The plate members 24 each have projecting therefrom in planes normal thereto a hollow tubular spacer member 26 which terminates in an enlarged platelike stop member 28. The stop members 28 and spacer members 26 are adapted to receive and support an end of an elongated screw member 30. The end portion of each of the screw members 30 that is supported by the stop members 28 projects through a suitable aperture provided in the base portion 22 of the range 18. The other or front end portion of each screw member 30 extends through suitable apertures provided in brace members 32 which in turn may be mounted against movement upon the support or base member 12. The stop members 28 as well as the brace members 32 are preferably provided with suitable bearings of any conventional type, not shown, for rotatably supporting the screw members 30. Each of the screw jacks 30 has threaded thereon a nut member 34 which is secured by any suitable means, not shown, to the base portion 22 of the range 18. A reversible electric motor 36 of any conventional type is positioned between the brace members 32 and mounted upon the support or base member 12 by any suitable means, not shown. The motor is provided with an elongated drive shaft 38 that has secured thereon an inner pulley 40 and an outer pulley 42. The inner pulley 50 is provided with a belt 44 which is entrained about a pulley 46 that is mounted on the outer or free end of one of the screw members 30. The outer pulley 42 on the shaft 38 is provided with a belt 48 which is entrained about a pulley 50 that is mounted on the outer or free end of the other screw member 30. As shown in FIG. VI, the pulleys 46 and 50 are mounted on the free ends of the screw members 30 so as to be in spaced parallel aligned relation with the pulleys 40 and 42 respectively. The motor 36 is provided with a reversing switch of any conventional type, not shown, which may be manually actuated so as to drive the motor and shaft 38 in either a forward or reversing direction. Suitable limit switches 51 may be employed for engagement by the base portion 22 of the range 18 to limit the movement of the range either towards or away from the wall 16.

In the operation or use of the screwjack mechanism for moving the range 18 from the dotted line position of FIG. II to the full line position, the motor 36 may be actuated by throwing the switch so as to rotate the drive shaft 38 and the pulleys 40 and 42. The rotating movement of the pulleys 40 and 42 will be transmitted to the pulleys 46 and 50 by means of the belts 44 and 48 respectively, which will result in a rotation of the screw members 30 and a movement of the nut member 34 on each of the screw members 30. Inasmuch as the base portion 22 of the range 18 is connected to the nut members 34, the base portion 22 as well as the range 18 will move along the screw members 30 as the nut members 34 move from say the stop members 28 towards the brace members 32 at the forward end portions of the screw members 30. The base portion 22 and range 18 will result in the range being moved outwardly from the wall member 16 which will then permit a person to readily service the range from the rear position thereof or to effect a cleaning of the area normally occupied by the range when in its usual position against the wall member 16. When it is desired to return the range to its normal position against the wall member 16, the motor 36 will be actuated to run in the opposite or reverse direction which motion will be transmitted to the screw members 30 by means of the respective pulleys for moving the nut members 34 towards the stop members 28. This movement will be the reverse of the previously defined movement resulting in the base portion 22 and range 18 being moved towards the wall member 16. As the base portion 22 approaches the stop members 28, said base portion will engage the limit switch 51 for the purpose of cutting off the motor 36 at about the same time that the base portion 22 engages the stop members 28.

As shown in FIG. III, a wall-mounting member 52 is provided for securing to the wall member 16 in lieu of the plate members 24. The wall-mounting member 52 is provided with suitable slots 54 which are adapted to receive the inner ends of the tubular hollowed spacer members 26. In certain instances, the wall-mounting member 52 may be used in lieu of the spacer members 26 with the inner ends of the screw members 30 being positioned within the slots 54.

As shown in FIGS. IV and V, a baseplate member 56 is provided which may be secured to the support or base member 12 by suitable fastening members such as screws extending through the apertures 58 provided in said baseplate member 56. The baseplate members is provided along opposite edges thereof with suitable trackways 60 which are designed to receive rollers or casters 62 provided on the bottom of the range 18. These rollers or casters 62 will tend to facilitate the movement of the range over the baseplate member 56 and onto the support or base member 12 upon the actuation of the motor 36 and the rotation of the screw members 30.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A device for moving a major kitchen appliance or the like over a relatively flat horizontal surface comprising a pair of spacer elements secured to an abutting member in spaced parallel relation to one another, a base portion on said appliance, a pair of elongated screw members projecting through said base portion in spaced parallel relation to one another, and end of said screw members supported by said spacer elements, a nut threaded on each of said screw members and connected to said base portion, a pulley mounted on the other end of each of said screw members, a reversible motor positioned between said screw members, said motor having an elongated drive shaft, a pair of pulleys mounted in tandem on said drive shaft in spaced parallel relation to the pulleys on said screw members, belts entrained over the pulleys on said drive shaft and said screw members for rotating said screw members upon the energization of said motor to move said nuts and base portion toward and away from said spacer elements.

2. A device for moving a major kitchen appliance or the like as set forth in claim 1 wherein the other end portions of said screw members are supported by braces, said braces and spacer elements having suitable bearings for rotatably supporting said screw members.

3. A device for moving a major kitchen appliance or the like as set forth in claim 1 wherein said motor is controlled by limit switches engaged by said base portion as it moves over said flat horizontal surface.

4. A device for moving a major kitchen appliance or the like as set forth in claim 1 wherein a baseplate member is secured to said flat horizontal surface, said baseplate member having spaced trackways provided thereon for receiving and guiding rollers mounted on said base portion, said baseplate member having said electric motor positioned thereon intermediate said trackways.

* * * * *